Dec. 8, 1931.  G. B. BERGEN, JR  1,835,133
MEANS FOR HANDLING FREIGHT AND EXPRESS
Filed July 17, 1926    7 Sheets-Sheet 1

Dec. 8, 1931.  G. B. BERGEN, JR  1,835,133
MEANS FOR HANDLING FREIGHT AND EXPRESS
Filed July 17, 1926   7 Sheets-Sheet 3

Dec. 8, 1931. G. B. BERGEN, JR 1,835,133
MEANS FOR HANDLING FREIGHT AND EXPRESS
Filed July 17, 1926 7 Sheets-Sheet 4

George B. Bergen Jr.
By Ira Milton Jones
Attorneys

Dec. 8, 1931.  G. B. BERGEN, JR  1,835,133
MEANS FOR HANDLING FREIGHT AND EXPRESS
Filed July 17, 1926  7 Sheets-Sheet 6

Patented Dec. 8, 1931

1,835,133

UNITED STATES PATENT OFFICE

GEORGE B. BERGEN, JR., OF MILWAUKEE, WISCONSIN

MEANS FOR HANDLING FREIGHT AND EXPRESS

Application filed July 17, 1926. Serial No. 123,190.

This invention relates to certain new and useful improvements in means for handling freight and express, and is especially designed to facilitate the handling of freight and express by transferring the same from warehouse to freight car, warehouse to an automotive truck and then to freight car, etc.

Numerous devices have been designed to relieve the congestion incidental to the handling of the freight and express at loading and unloading points and reduce the cost of handling, all of which have been either entirely disregarded or have met but moderate favor due to their costly construction, and heavy or otherwise impractical design.

This invention contemplates as a general object the provision of an improved arrangement whereby freight and express may be easily moved to eliminate unnecessary handling at the warehouse and the freight loading point.

Another object of this invention resides in the provision of an improved means for handling freight and express whereby the same may be loaded and sealed at the shippers and remains sealed until its arrival at destination.

Another object of this invention resides in the provision of an improved device whereby a freight or express carrying car or receptacle may be readily moved from one freight car to another.

Another object of this invention resides in the provision of an improved means for relieving the automotive truck springs of the load as a loaded receptacle is moved therefrom, which means also has provision for aligning the automotive truck body with the warehouse platform or flat car.

Another object of this invention resides in the provision of means for elevating the front end of the automotive truck above the level of the warehouse platform or flat car in unloading to facilitate the movement of the loaded receptacle from the truck onto the warehouse platform or flat car and for lowering the front end of the automotive truck to a point below the level of the warehouse platform or flat car in loading the automotive truck to facilitate the movement thereon of the receptacle.

Another object of this invention resides in the provision of improved means for properly aligning the automotive truck carried track with the track of the warehouse platform or flat car to facilitate the shifting of the receptacle from the truck to the warehouse or platform.

Another object of this invention resides in the provision of improved means for firmly locking the receptacles in place on the automotive truck or flat car so that the same may become as a part thereof and thus withstand the shocks and vibrations incidental to the movements of the trucks or flat cars.

A further object of this invention resides in means for properly aligning the locking elements carried by the receptacle and flat car or a truck to thus facilitate the securing of the receptacles to flat cars or trucks.

With the above and other objects in view which will appear as the description proceeds, my invention resides in the novel construction, combination and arrangements of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 12 is a fragmentary perspective view of the end of the warehouse platform track or flat car track.

Referring now more particularly to the accompanying drawings, in which like numerals designate like parts throughout the several views, the numeral 5 designates a receptacle adapted to be loaded with express or freight matter and arranged for transportation either by vehicle, truck, trailer or flat railway car, in the manner hereinafter described. The receptacle may be of any desired design and size, but it has been found by experience that one approximately fourteen feet long by seven feet high and six feet eight inches wide is best adapted for practical use in that a receptacle of this size best fits the conventional truck chassis and railway flat car. It will be understood, however, that these dimensions may readily be varied to suit various conditions.

The receptacle 5 preferably consists of a main frame including longitudinal and transverse sills 6 and 7 from which extend vertical side frame members 8 connected at their top by transverse roof beams 9, a suitable covering 10 of metal, wood or the like forming side and top walls and the top having a central longitudinal walk-way 11 to permit the train men to cross thereover. The receptacle illustrated is designed to be loaded from its ends adapted to be normally closed by a pair of doors 12 hinged, as at 13, to the side walls, and a bottom gate or door member 14 hinged to the receptacle bottom, as at 15.

Connecting the transverse sills of the receptacle are two spaced channel beams 16 which extend throughout the length of the receptacle and have bearing members 17 secured thereto at intervals to mount axles or shafts 18 extending from the aligned bearings of the sills. The shafts 18 are preferably secured against rotation by a binding screw or other means 19 passed through registering ears formed on opposite sides of a slit or slot 21 in the bearing, see Figure 7.

The ends of the axles 18 project beyond the sills 16 to rotatably mount flanged wheels 22 adapted to be secured thereon by cotter pins or other means 23. Each bearing 17 is preferably flanged, as at 24, and is secured flush against the vertical wall 25 of the adjacent channel beam between the horizontal portions 26 thereof by rivets or other fastenings 27. The bearings being fixed to the beams and axles prevent spreading of the channel beams. The receptacles are thus adapted to be readily transported by trucks or trailers 28 equipped with tracks, the rails of which are spaced apart equal to the space between the treads of the flanged wheels 22. The unloading platform 29 at the warehouse and the flat car 30 are equipped with tracks to facilitate the shifting of a receptacle from warehouse to truck or flat car and vice versa or from the truck directly to the flat car or vice versa as hereinafter described.

Figure 4:
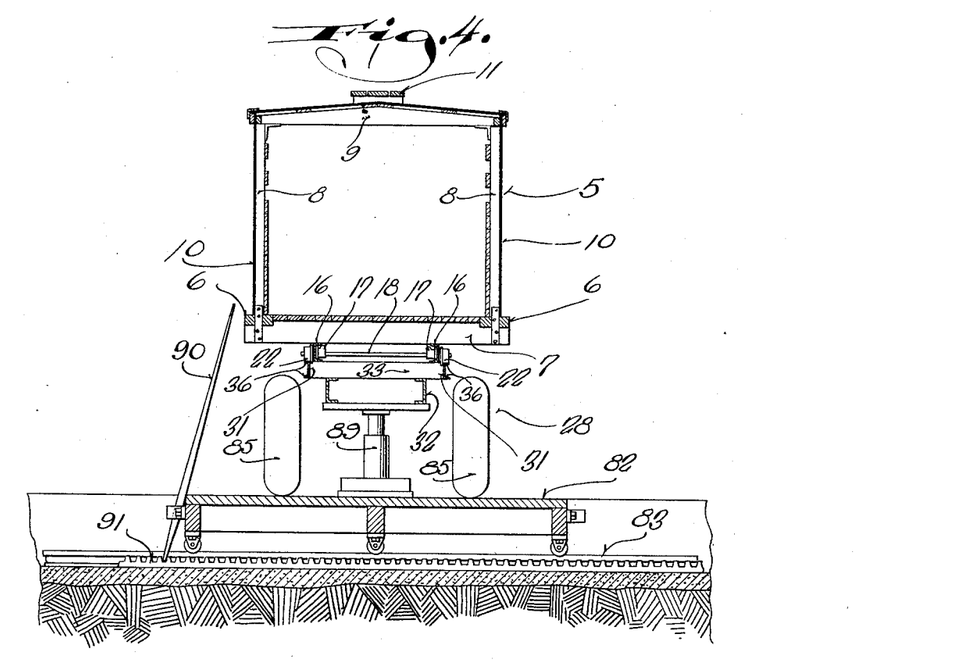
Figure 4 is a view, partly in section and partly in elevation, taken through Figure 3 on the plane of the line 4—4.
Figure 5:
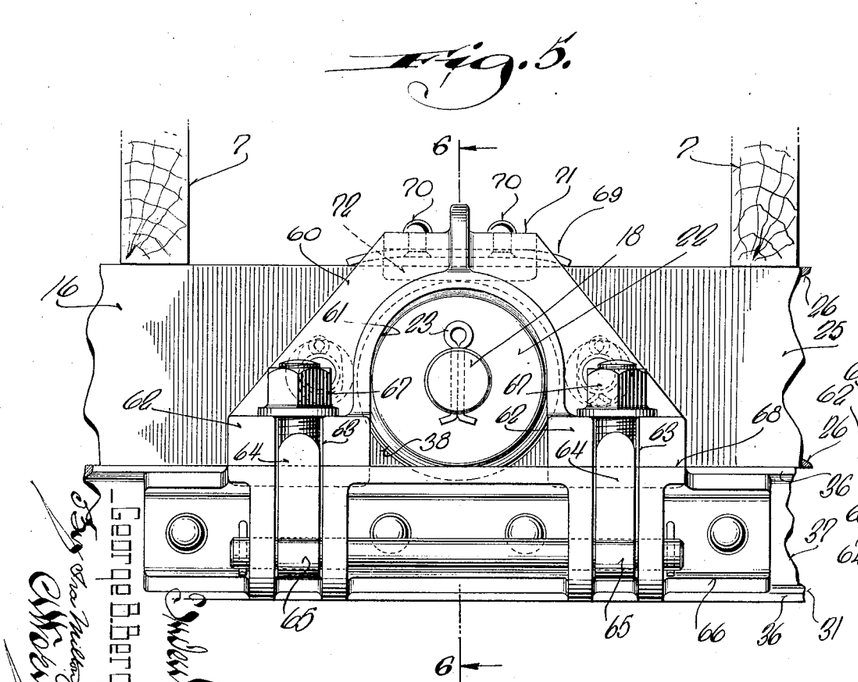
Figure 5 is a side elevational view of one of the means for locking the receptacle to the track of a flat car or truck, the latter adaptation being illustrated.
Figure 6:
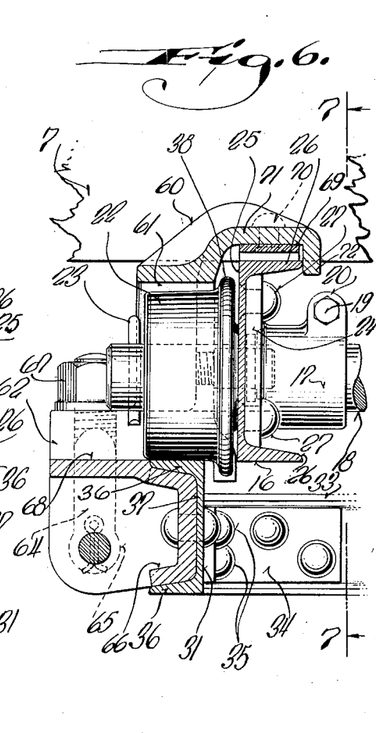
Figure 6 is a sectional view with parts in elevation, taken through Figure 5 on the plane of the line 6—6.

In Figures 3 to 6, inclusive, is illustrated the type of track with which the automotive truck or trailer 28 is equipped for the conveyance of a receptacle constructed in accordance with this invention wherein two channel beam rail members 31 are suitably secured to the chassis frame 32 of the vehicle by transverse beams 33 connected with the rail members 31 at their ends by angle plates or the like 34 riveted or otherwise secured thereto, as at 35. The beams 33 are of less height than the rail members 31 to place the uppermost surface of the rails thereabove and permit the free passage of the wheel flanges thereover, as best illustrated in Figure 6. The horizontal or flange portions 36 of the rail members 31 project outwardly in contradistinction to the transverse flanges 26 of the channel beams 16 which project inwardly and the inner surfaces of the vertical web portions 37 of the rail members 31 are spaced apart as previously stated a distance slightly greater than the distance between the flanges 38 of the wheels 22.

The flat cars designed for conveying my improved receptacle are equipped with a track construction on their decks preferably consisting of two rails 39 spaced apart a distance equal to the space between the rails 31 of the truck carried track and secured to the flat car by spikes, bolts or any other suitable means, not shown, the rails 39 of the flat car carried track being preferably of the railroad type and thus of heavier construction than the beams 31 due to the added stresses incidental to the longer hauls made by the flat cars.

Figure 2:
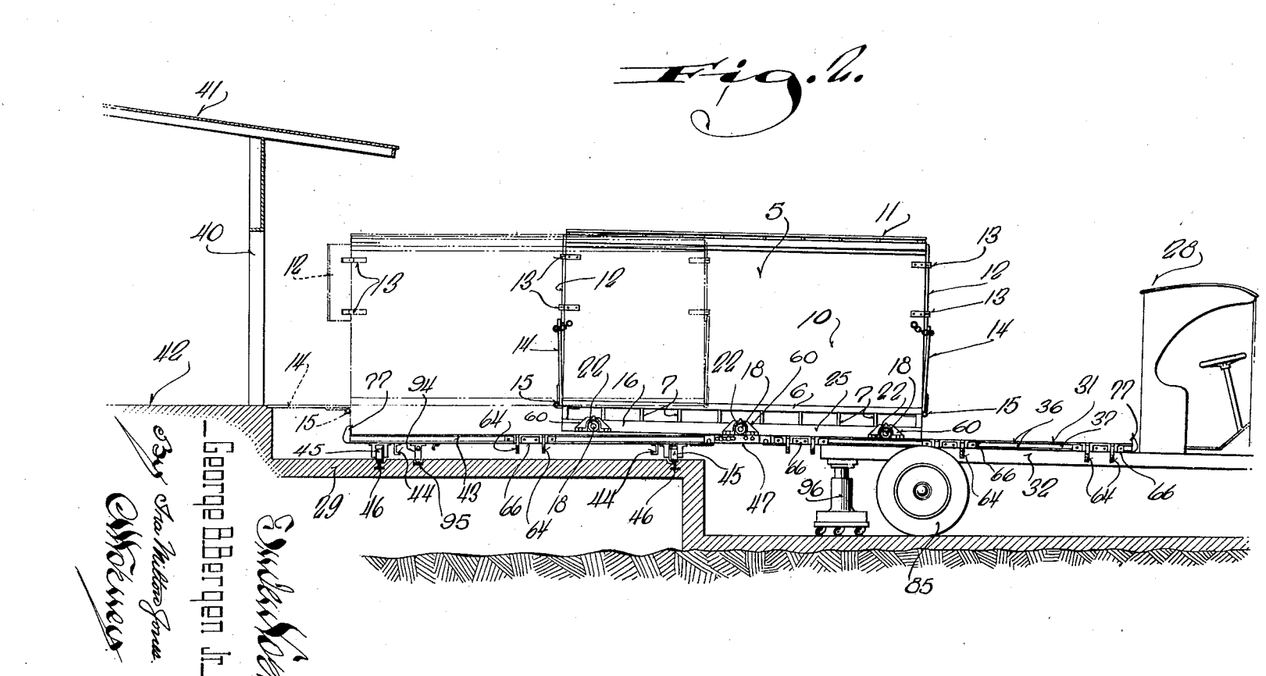
Figure 2 is a view, partly in transverse section and partly in side elevation, illustrating the movement of a receptacle from a warehouse platform onto an automotive truck.

The warehouse track is preferably mounted for movement along the warehouse platform to facilitate aligning the receptacle with any door-way 40 of the warehouse 41 so that the doors 12 and 14 of the receptacle may be swung open to permit the ready unloading or loading of the receptacle, the door or gate member 14 preferably forming a continuation of the floor of the receptacle to the floor 42 of the warehouse, as illustrated in Figure 2. The warehouse track consists of two spaced channel beams 43, similar to the rail members of the truck or trailer, connected in proper spaced relation by transverse beams 44 and carrying supporting wheels 45 engageable with a track construction 46 on the warehouse platform so that the warehouse track, as a unit, may be shifted transversely, as previously described.

Figures 10, 11, 14:
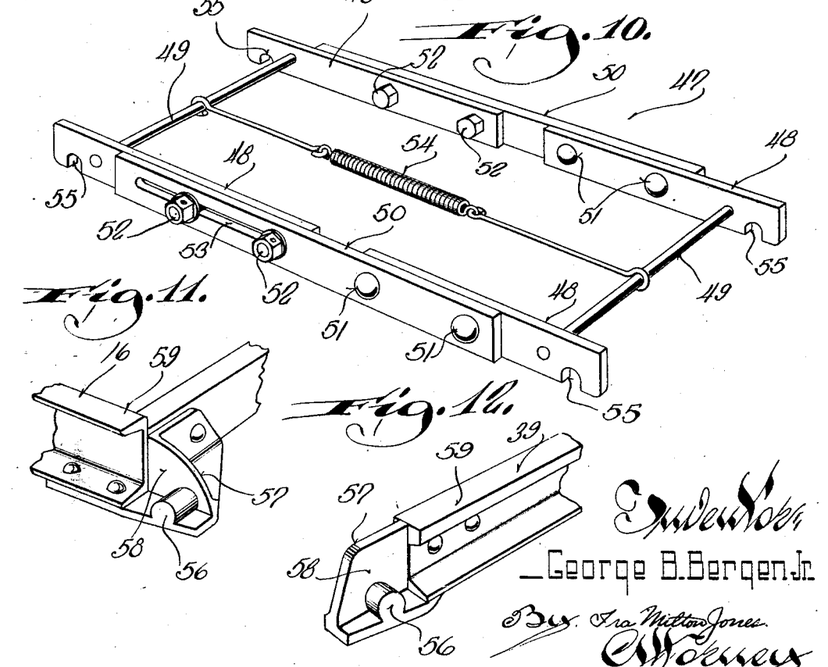
Figure 10 is a perspective view of the removable connecting element for connecting the tracks of an automotive truck with the tracks of a flat car or warehouse platform.
Figure 11 is a fragmentary perspective view of the rear end of one track of the automotive truck.

The track constructions of the flat car, truck or trailer and platform are connected end to end by a bridging track device 47 as illustrated in Figure 10, to permit the movement of the receptacle from the truck to the warehouse or warehouse to the truck, from the warehouse directly to the flat car or from flat car to warehouse, from the truck to the flat car or flat car to truck, or from flat car to flat car. The track bridge 47 consists of two pairs of complementary members 48 having their outer ends connected by a rod or other spacing means 49 and their inner ends connected by side beams 50, the beams 50 being riveted or otherwise secured, as at 51, to one pair of members 48 and being slidably connected with the members 48 of the other pair by bolts or other means 52 carried by the members 58 and passed through slots 53 in the adjacent ends of the members 50. A contractile spring 54 has its ends connected with the rods 49 so that the track bridge is normally contracted to its minimum length and the bottom edge of the upper portions of the members 48 are notched, as at 55, for engagement with projections or lugs 56 carried by extension brackets 57 secured to the ends of the respective vehicle, flat car and warehouse tracks in the manner now about to be described.

The brackets 57 are preferably castings, each having a vertical flange 58 adapted to approximately align with the tread portion 59 of the track to which it is secured and the lug or projection 56 thereof is so located that when one notch 55 of the track bridge is engaged therewith, the adjacent member 48 thereof forms a substantial continuation of the rail tread. The receptacle may then be transferred as illustrated in Figures 1, 2, 3 and 13, the extensibility of the track bridge permitting a variance between the space between the respective track constructions, as will be readily apparent, the spring 54 by maintaining a tension between the notches 55 and the projections retaining the bridge in place.

After the receptacle has been moved onto either truck, warehouse platform tracks or the flat car, it is locked against accidental removal by means associated with the rail members and the receptacle channel beams 16. Yoke shaped castings 60 having their medial portions cut-away, as at 61, to receive the adjacent wheels 22 are adjustably fixed to the receptacle frame channel beams 16 adjacent each member 17 and the ends 62 of their yoke arms are directed laterally and provided with transverse slots or recesses 63 to receive locking bolts 64 pivoted at their lower ends, as at 65, to carry plates or castings 66 fixed to the rail members of the flat car, warehouse platform or truck. Two bolts 64 are pivoted from each plate 66 and are spaced apart a distance equal to the distance between the recesses 63, locking or binding nuts 67 being threaded on the upper free end of the bolts 64 to engage the top surfaces of the lateral projecting ends 62 and clamp the same firmly against the top surface 68 of the plate 66 against its spring 69, as best illustrated in Figures 5 and 6.

Figure 7:
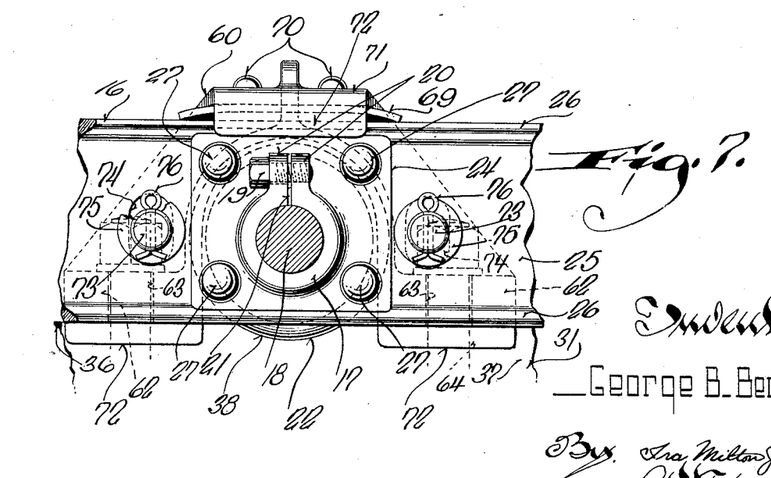
Figure 7 is a view, partly in elevation and partly in section, taken through one axle of a receptacle and illustrating the inner side of the locking device, said view being taken through Figure 6 on the plane of the line 7—7.

The yoke shaped casting 60 is vertically adjustably secured to the receptacle channel beam 16 and is adapted to be tightly drawn against the surface 68 of the plate 66 to lock the receptacle to the warehouse, flat car or truck rails, as the case may be. A leaf spring 69 is secured, as at 70, to the upper end portion 71 of each casting 60 to normally yieldably maintain the under surface of the lateral end of the casting slightly above the flat car, warehouse or truck tracks and the bottom of the receptacle channel beam 16. The portion 71 of each casting overhangs the top surface of the channel beam 16 and has its extreme end 72 directed downwardly over the inner end of the flange 26 to prevent accidental displacement and to act as a guide for the casting. As stated, spring 69 normally tends to move its casting 60 upwardly to maintain the lower face thereof above the top surface of the rail members mounted on the truck, flat car or warehouse platform, and when placed under tension by the clamps and bolts 64, the spring takes up all probable slack between the parts and substantially eliminates all noises incidental to the movement of the receptacle while empty. The castings 60 are secured to the receptacle channel beams as best shown in Figures 5, 6 and 7 by pins 73 fixed thereto and passed through elongated openings 74 in the channel beams, washers 75 and pins or other means 76 securing the bolts in the elongated openings.

In order to facilitate the securing of the receptacle to the flat car, truck or warehouse platform, a stop 77 is arranged to be engaged by the leading end of the adjacent channel beam 16, and is so spaced that with the beam 16 abutting the same, the slots 63 of the castings 60 align with their respective locking bolts 64.

Figures 3, 8:
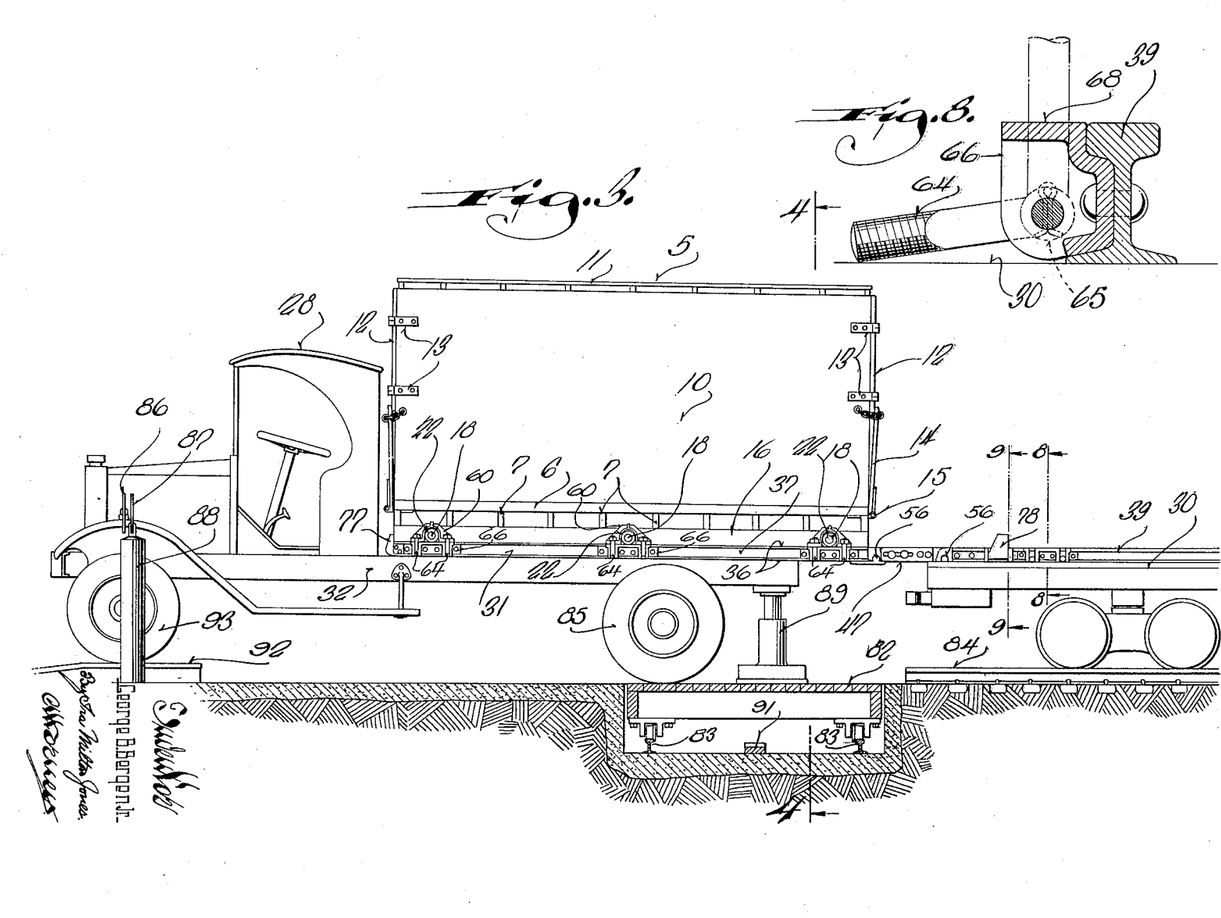
Figure 3 is a view similar to Figure 2 illustrating the manner of shifting a receptacle from a truck onto a flat car.
Figure 8 is a fragmentary sectional view taken through Figure 3 on the plane of the line 8—8 and illustrating the manner of securing one element of the locking device to the flat car carried track.
Figure 13:
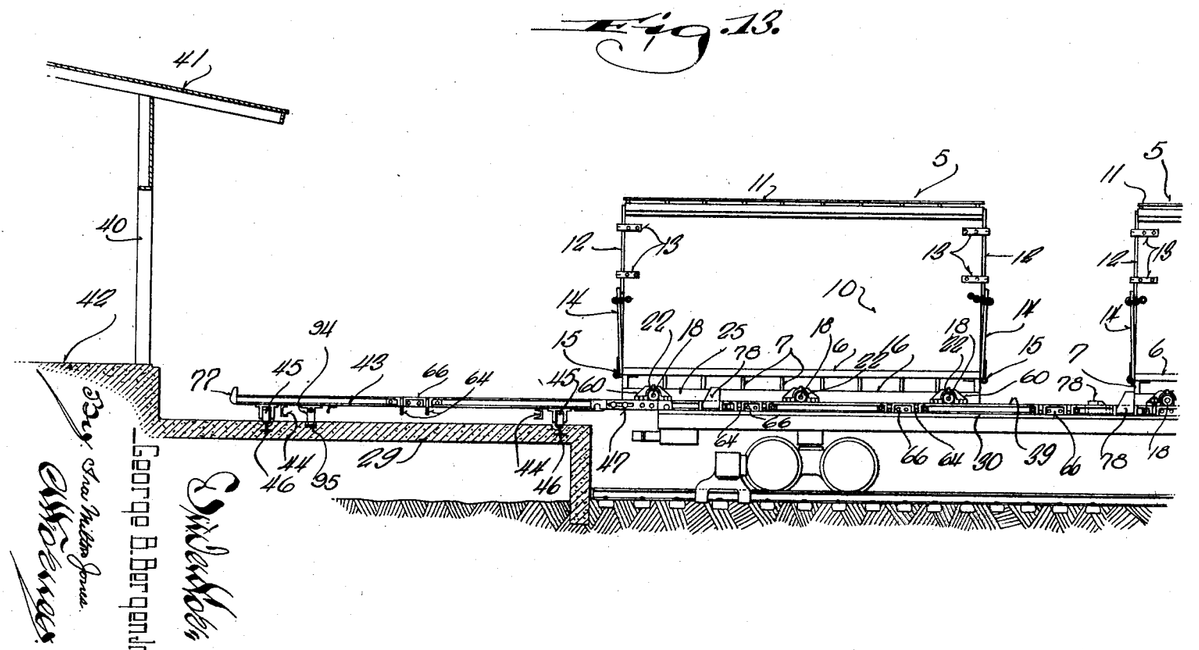
Figure 13 is a view in side elevation illustrating the manner of loading and unloading directly from warehouse platform to flat car and vice versa.

The stops of the warehouse platform track and truck are fixed as illustrated in Figures 2, 3 and 13, whereas the stops for the flat car carried tracks are movable to and from active position to accommodate the movement of the receptacle from one car to another and from truck to flat car.

Figure 9:
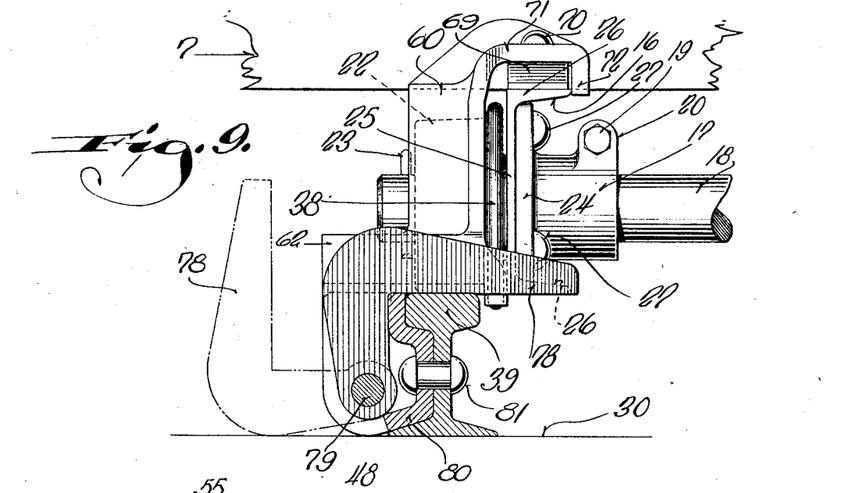
Figure 9 is a view, partly in elevation and partly in section, illustrating the stop device for aligning the respective aligning elements of the truck or flat car with those of the receptacle, said view being taken through Figure 3 on the plane of the line 9—9.

The flat car stops are in the form of angular members 78 pivoted, as at 79, to plates 80 secured to the rail members 39 by rivets or other means 81 so that the stops may be swung to their active positions illustrated in Figure 9, or to their inactive positions illustrated by dotted lines therein.

Figure 1:
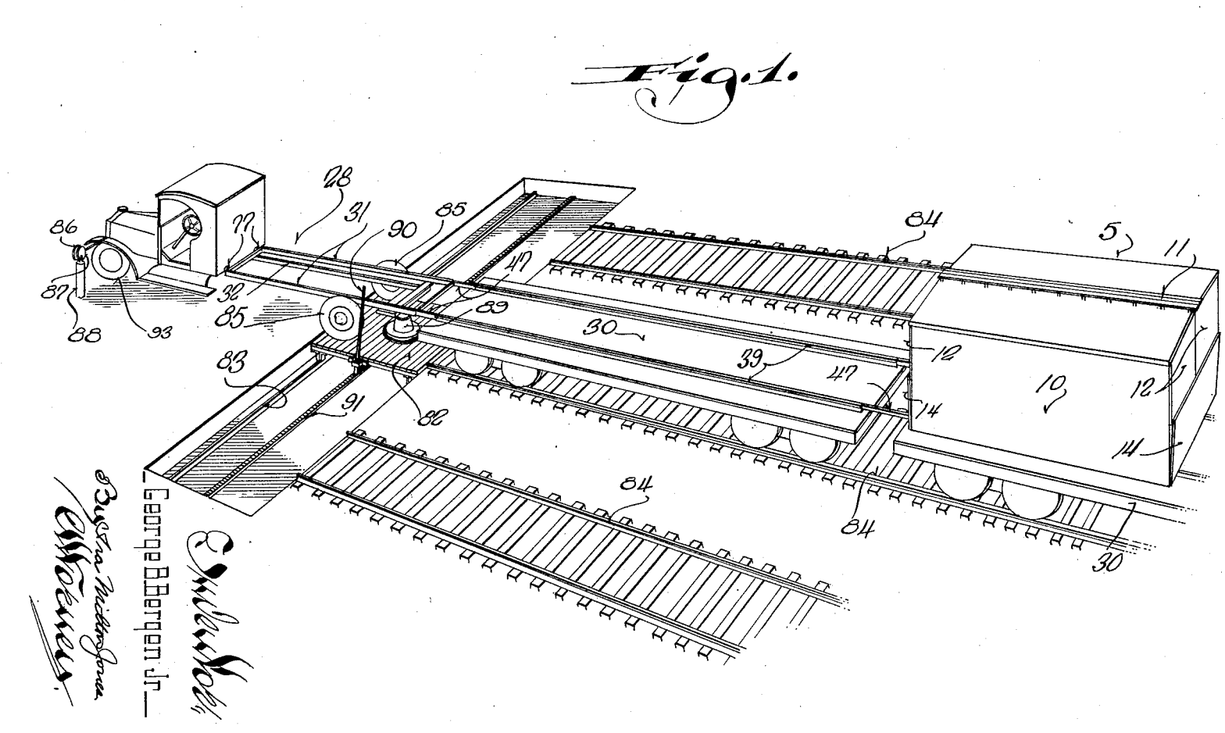
Figure 1 is a perspective view of an automotive truck and a series of flat cars equipped with my invention and illustrating the manner of loading a receptacle from an automotive truck onto a flat car remote from the endmost car of a train.

It is very desirable that means be provided to facilitate the quick alignment of the truck carried rail members with those of the flat cars to facilitate the ready movement of a receptacle from truck to flat car, or vice versa. In Figures 1, 3 and 4 is illustrated one improved manner of quickly aligning a truck with a flat car, in which a platform 82 is mounted on depressed supporting tracks or guides 83 for movement transversely of the ends of the railroad tracks 84, the platform being designed to receive the rear wheels 85 of the automotive truck 28. When the truck 28 is to be positioned to receive or discharge a receptacle 5, the platform 82 is arranged in approximate alignment with the track 84 of the flat car or train of flat cars and the truck 28 is backed onto the platform, its front end being properly positioned by means of a disc or guide member 86 carried by a forward portion of the truck and a cooperating disc or guide member 87 fixed to a guide post 88. The post 88 is so mounted that when the discs or guide members 86 and 87 are in register, the forward portion of the truck is in direct line with the end of the adjacent track 84.

A jack or other support 89 carried by the platform 82 is engaged with the rear end of the truck chassis frame to elevate the same sufficiently to bring the rail members 31 thereof on the same horizontal plane with the rail members of the adjacent flat car. The platform 82 is then shifted along the guides 83 by a pry bar or lever 90 cooperating with a rack 91 to bring the rail members 31 in true longitudinal alignment with the rail members 39 of the flat car. The bridging device 47 is then employed to connect the rail members of the truck and flat car to permit the free movement of the receptacle from one to the other.

In transferring a receptacle from a truck onto a flat car, inclined ways 92 are preferably arranged to receive the truck front wheels 93 so that the rail members 31 thereof incline downwardly toward the flat car so that when the nuts 67 are loosened and the bolts 64 dropped to inactive position, the receptacle may be freely moved onto the flat car without the use of machinery or the exercise of undue effort on the part of the operator. In loading from flat car onto truck, the inclined ways 92 are eliminated to reverse the inclination of the truck rail members, as will be readily evident.

When the transfer of a receptacle is being made from the warehouse rail members 43 to the flat car, the track structure is shifted to align with the rail members of the flat car and the two connected by the bridging device 47. While the bridging device serves to prevent the disalignment of the warehouse and flat car tracks during the transfer, a pivoted dog or stop 94 may be engaged with a rack 95 as an additional safeguard. The tail gate 14 of the receptacle 5 in addition to closing the ends of the receptacle provides a bridge for connecting the receptacle with the main platform of the warehouse for the purpose of unloading, as best illustrated in Figure 2. After the receptacle has been moved onto the warehouse track 43 and there secured, the track structure is moved transversely along the platform 29 until the receptacle registers with the desired door 40 when the track structure is locked by the stop or dog 94 and the receptacle unloaded.

When the receptacle is being transferred directly from the truck onto the warehouse platform or vice versa, a movable jack 96 may be employed to elevate the rear of the truck to the proper height with respect to the platform track 43 and the tracks 43 and the rail members 31 of the truck are connected by a bridging device 47, as previously described. It will be readily apparent that the jacks 89 and 96 not only provide means for disposing the discharge end of the truck on the proper plane with respect to the warehouse or flat car tracks, but provide a brace or support for relieving the truck chassis frame of undue strain when the major portion of the receptacle load is at the rear end thereof.

From the foregoing description taken in connection with the accompanying drawings it will be readily obvious that I have provided an improved means for transporting express and freight which will effect an economy in the time required for shipping packages of freight or express, which will materially reduce the overhead cost connected therewith by reason of the reduction of the handling and which readily lends itself to application to all railroads without requiring expensive alterations in rolling stock and other equipment.

Having thus fully described my invention, what I claim as new and desire to secure by Letters Patent, is:—

1. A transportation means, comprising the combination with a conveying vehicle, of demountable receptacles adapted to be placed thereon, means carried by the vehicle for supporting the receptacles, roller means carried by the receptacles to facilitate their movement onto the vehicle, securing means carried by the receptacle and positioned over the roller means, and means for rigidly securing the securing means to the supporting means.

2. In a transportation system, the combination with a conveyor and a receptacle movable thereon, of means for securing the receptacle against displacement, comprising a guide track fixed upon the conveyor to receive the receptacle, an element carried by the receptacle and movable in a vertical plane substantially above the track, an element carried by the track and engageable by said receptacle carried element, and yieldable means normally holding the first mentioned element above the track, said yieldable means permitting limited vertical movement of the receptacle when the elements are engaged to secure the receptacle in fixed position.

3. In a conveying vehicle adapted to receive a wheeled receptacle, securing means carried by the receptacle and embracing the wheels thereof, means carried by the vehicle and engageable with said first mentioned means whereby longitudinal movement of the receptacle on the vehicle is prevented but a limited vertical movement thereof is permitted.

4. In a conveying vehicle adapted to receive a wheeled receptacle, means carried by the vehicle over which the receptacle is moved to and from its normal position, means for securing the receptacle against displacement from the vehicle and comprising a member embracing one wheel of the receptacle, means carried by the first mentioned means and engageable with the embracing means to secure the receptacle against longitudinal movement with respect to the vehicle, and spring means carried by said embracing member for yieldably opposing vertical movement of the receptacle.

In testimony whereof I affix my signature.

GEORGE B. BERGEN, JR.